Patented Oct. 12, 1943

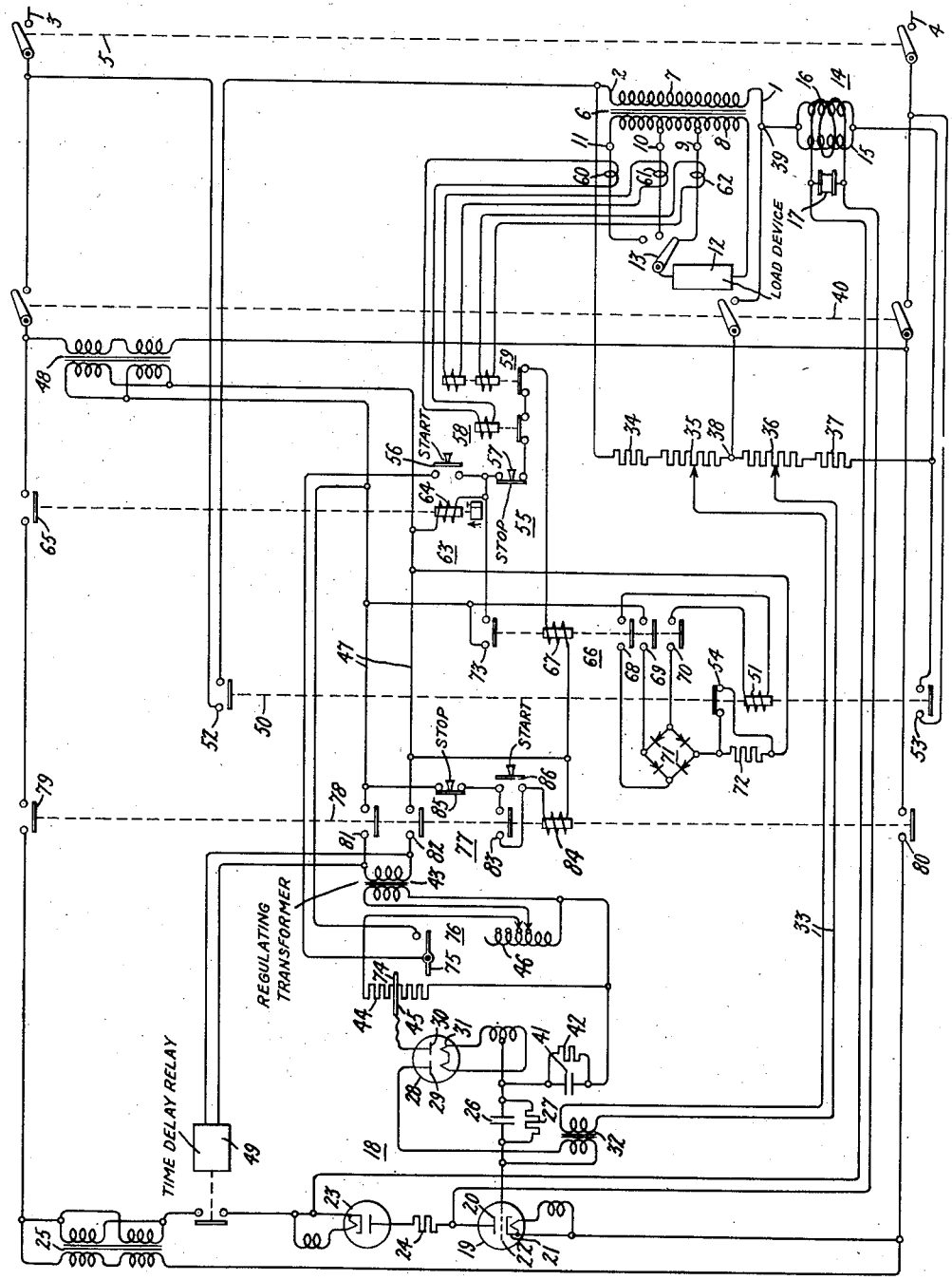

2,331,731

UNITED STATES PATENT OFFICE 2,331,731

ELECTRIC VALVE CIRCUIT

August R. Ryan, Schenectady, N. Y., assignor to General Electric Company, a corporation of New York Application August 1, 1941, Serial No. 404,974

6 Claims. (Cl. 171—119)

My invention relates to electric circuits and more particularly to electric valve circuits for controlling an electrical condition, such as the voltage, of an associated load circuit.

Electric valve apparatus has been employed to control electrical conditions, such as the voltage of an associated load circuit, by controlling the magnetization of a saturable inductive device or reactor. For example, saturable inductive devices and associated electric valve control equipment have been employed to maintain the the voltage impressed across a load circuit at a substantially constant value under varying load conditions. In accordance with the teachings of my invention described hereinafter, I provide a new and improved control circuit for electric valve apparatus which provides a greater precision of the control than that afforded by the prior art arrangements, and which is of a nature permitting application to systems requiring a high degree of precision and reliability.

It is an object of my invention to provide a new and improved electric translating system.

It is another object of my invention to provide new and improved control systems for electric valve translating apparatus.

Briefly stated, in the illustrated embodiment of my invention I provide an electric translating system for controlling the voltage of an associated load circuit by means of a saturable inductive device or reactor including a control winding which is variably energized by electric valve means. Time delay apparatus is employed to delay energization of the control winding of the saturable reactor a predetermined interval of time after the connection of the main or alternating current winding of the reactor to the supply circuit, in this manner affording a sufficient interval of time to permit any voltage or current transient to disappear.

For a better understanding of my invention, reference may be had to the following description taken in connection with the accompanying drawing and its scope will be pointed out in the appended claims. The single figure of the accompanying drawing diagrammatically illustrates an embodiment of my invention as applied to a system for energizing an alternating current load circuit from an alternating current supply circuit.

Referring now to the single figure of the drawing, my invention is there illustrated as applied to a control or protective system for energizing a load circuit comprising conductors 1 and 2 from an alternating current supply circuit including conductors 3 and 4. A suitable switching means 5 may be employed between the supply circuit and the system. A power transformer 6, having a primary winding 7 and a secondary winding 8, is connected to the load circuit, and the secondary winding 8 may be provided with taps 9, 10 and 11 to afford a number of output voltages which may be impressed across the load device 12. A selector switch 13 is connected between the load device 12 and the various taps of secondary winding 8.

As a control or regulating means for controlling the voltage impressed across the load circuit and hence to control the voltage supplied to the load device 12, I provide a saturable inductive reactance or a saturable inductive device 14 comprising main windings 15 which are connected in series relation with the load circuit, that is in series relation with the primary winding 7 of transformer 6. The inductive reactance of windings 15 is controlled by means of a control winding 16 which is variably energized by unidirectional current to control the voltage drop across windings 15 and, hence, to control the magnitude of the voltage supplied to the power transformer 6. A suitable voltage limiting means, such as a resistance 17, is connected across the terminals of the control winding 16. Resistance 17 may be of the type having a negative nonlinear impedance-current characteristic.

I employ an electric valve circuit 18 for transmitting variable amounts of unidirectional current to the control winding 16 in response to an electrical condition, such as the voltage of the load circuit. The electric valve circuit 18 comprises an electric valve means 19 preferably of the type employing an ionizable medium, such as a gas or a vapor, and includes an anode 20, a cathode 21 and a control member or grid 22. A unidirectional conducting device, such as an electric valve means 23, is also connected to the control winding 16 in order to provide a path for the flow of current during the negative or reverse half cycles of voltage impressed across winding 16. A current limiting resistance 24 may be connected in series relation with electric valve 23. A transformer 25 is employed for supplying power to the electric valve circuit 18 and also serves as a source of current for control winding 16.

I employ an excitation means or excitation circuit for controlling the potential of the grid 22 of electric valve means 19 and for controlling the magnitude of the unidirectional current transmitted to control winding 16 in response to the magnitude of the load voltage. The excitation circuit includes one control means comprising a capacitance 26 and a shunt connected resistance 27 which are energized by unidirectional current through a unidirectional conducting path which may be provided by an electric valve means 28 having a pair of anodes 29 and 30 and a cathode 31. The voltage produced by capacitance 26 is a negative or turn-off voltage and varies in response to the magnitude of the load voltage. Transformer 32 is energized principally in response to the magnitude of the load voltage through circuit 33 which, in turn, is connected to a voltage divider comprising resistances 34–37, inclusive, the terminal 38 thereof being connected to the common juncture 39 of the primary winding 7 of transformer 6 and windings 15 of the saturable inductive device 14. A switch 40 may be employed to connect the voltage divider to the common juncture 39, and may also be employed as a means for connecting the electric valve circuit and associated control apparatus to the supply circuit. Resistances 34–37, inclusive, are proportioned so that the voltage of circuit 33 varies principally in accordance with the voltage appearing across primary winding 7 and is affected only slightly by the magnitude of the supply voltage.

The excitation circuit for energizing grid 22 of electric valve means 19 also includes a second control means for providing a positive or turn-on voltage. This second control means may comprise a parallel connected capacitance 41 and a resistance 42 which are energized by unidirectional current through the discharge path of electric valve means 28 provided by anode 30 and cathode 31. The second control means is energized by a substantially constant voltage provided by a voltage regulating transformer 43. A voltage divider including a resistance 44 and an adjustable contact 45 is provided to control or establish the magnitude of the voltage which is impressed across the load circuit and to assist with interlocking means, described hereinafter, to prevent closure of the operating circuit or initiating means unless the contact 45 is in that position which assures the application of a relatively low voltage to the load circuit. This interlocking feature is disclosed and broadly claimed in a copending patent application Serial No. 404,973 of Elbert D. Schneider, filed concurrently herewith, which matured into Patent No. 2,285,173 on June 2, 1942, and which is assigned to the assignee of the present application. A suitable voltage adjusting or controlling means, such as an auto-transformer 46, may be connected across the output terminals of the voltage regulating transformer 43. Voltage regulating transformer 43 may be energized from circuit 47 which in turn is energized from the supply circuit through a transformer 48. A time delay relay 49 is also employed to delay the application of anode-cathode voltage to electric valves 19 and 23 for a predetermined time, thereby permitting the cathode heating elements of these electric valves to assume safe operating temperatures.

Circuit controlling means 50 are employed for connecting the load circuit to the supply circuit. The circuit controlling means 50 may be of the contactor type including an actuating coil 51 and power contacts 52 and 53 which are connected in series relation with primary winding 7 of transformer 6 and the saturable inductive device 14. The circuit controlling means 50 is also provided with control or sealing contacts 54.

Operating means are also provided for controlling the condition of the circuit controlling means 50. This operating means comprises an initiating circuit 55 including a start switch 56, a stop switch 57, and overload protective means, such as current responsive relays 58 and 59 which are energized in response to the load current through current transformers 60, 61 and 62.

I provide in the initiating circuit 55 a time delay relay 63 having an actuating coil 64 and contacts 65. This relay is employed to prevent the closure of, and the energization of, the electric valve circuit which energizes the control winding 16 of the saturable inductive device 14, while contacts 52 and 53 are in the open circuit position. In addition, it affords an interval of time within which any current or voltage transient of the inductive device 14 may disappear before closure of the control winding circuit through contacts 65 and before initiation of the regulatory action of the system.

I also employ a relay 66 having an actuating coil 67 and contacts 68—70. A rectifier 71 is employed for energizing the actuating coil 51 which is connected to the output terminals of rectifier 71 through contacts 68 and 70. Contacts 69 are employed to connect the input terminals of rectifier 71 to circuit 47 through a resistance 72. When circuit controlling means 51 is in the energized condition, contacts 54 are open, effectively connecting resistance 72 in series relation with the input terminals of rectifier 71, thereby effectively reducing the voltage applied to the rectifier and reducing the current supplied to coil 51. Relay 66 is also provided with a pair of holding or sealing contacts 73 which serve to keep actuating coil 67 energized after starting switch 56 is released.

I employ an interlocking means to prevent closure of the circuit controlling means 50 in the event the excitation circuit for the electric valve means 19 is in a condition which would effect the application of an excessive or injurious voltage to the load circuit. This interlocking means may be made responsive to the position of the movable member or contact 45 and may be provided with an extension 74 which engages the actuating or contact member 75 of a switch 76, the contacts of which are connected in series relation with the initiating circuit 55. By virtue of this connection, it is impossible to initiate operation of the operating means unless the contact 45 is in a position to impress a relatively low positive voltage on grid 22 of electric valve means 19. In other words, it is impossible to effect connection of the load circuit to the supply circuit if the saturable inductive device 14 is highly saturated, which condition would effect application of a high or undesirable voltage to the load circuit.

I also employ a second initiating circuit 77 including a contactor 78 having contacts 79 and 80 which serve to connect the supply circuit to the electric valve circuit 18 and which also include contacts 81 and 82 which connect transformer 43 to circuit 47. Contactor 78 is further provided with sealing-in contacts 83. Actuating coil 84 of the contactor 78 is connected to be energized from circuit 47 through a circuit including a stop switch 85 and a start switch 86.

The operation of the embodiment of my invention illustrated on the accompanying drawing will be explained by first considering the system during the starting operation. Switches 5 and 40 are closed, effecting energization of circuit 47. Closure of the start switch 86 effects energization of actuating coil 84 of contactor 78 and, consequently, effects closure of contacts 79–83, inclusive. The time delay relay 49 is initiated in its operation and, after an interval of time sufficient to permit the cathodes of the associated electric valve equipment to attain a safe operating temperature, closes its contacts to complete the circuit between the winding of transformer 25 and the anode-cathode circuits of the electric valves. The system may be started by closure of the starting switch 56. Upon closure of switch 56, actuating coil 67 of relay 66 will be energized if the contact 45 is in the lower position, that is, in a position to reduce to a minimum or to a very low value the magnitude of the positive or turn-on voltage. In this manner, an interlocking means is provided to assure that the saturable inductive device 14 is not saturated and thereby prevents the application of a high voltage initially to the load circuit. In other words, the circuit controlling means 50 through the relay 66 cannot be operated unless the contacts of the switch 76 are closed. If the contact 45 is in the lower position effecting closure of the contacts of switch 76, closure of the starting switch 56 energizes actuating coil 67 of relay 66 from circuit 47. Operation of relay 66 effects energization of actuating coil 51 of circuit controlling means 50, effecting closure of contacts 52 and 53 thereby connecting the power transformer 6 and the saturable inductive device 14 in series relation across the supply circuit. As explained above, the time delay relay 63 prevents energization of the circuit which energizes the control winding of the saturable inductive device to introduce a time delay period so that any transient current in the alternating current windings 15 of the saturable reactor caused by the closure of contacts 52 and 53 disappears before the closure of contacts 65. Adjustment of contact 45 establishes the magnitude of the unidirectional current transmitted to control winding 16 and, consequently, controls the magnitude of the voltage impressed across the load circuit.

The manner in which the system operates to maintain the voltage across the load circuit substantially constant will now be explained. As is well understood by those skilled in the art, the inductive reactance of windings 15 of the saturable inductive device 14 is determined by the magnetization or saturation of that device. As the magnitude of the current transmitted to winding 16 increases, the saturation of the inductive device consequently increases, effecting a reduction in the value of the inductive reactance. As the inductive reactance is decreased, the voltage drop across windings 15 correspondingly decreases and the voltage across the load circuit, that is across the primary winding 7 of transformer 6, increases. The voltage fed back to the control grid 22 of electric valve means 19 through circuit 33 and transformer 32 varies in accordance with the load voltage. As the voltage tends to increase above the desired value, the magnitude of the negative control voltage appearing across capacitance 26 correspondingly increases and serves to render the electric valve means 19 conducting at a later time during its positive half cycles of applied anode-cathode voltage, consequently effecting a reduction in the magnitude of the current transmitted to control winding 16 and correspondingly increasing the inductive reactance of windings 15. As a result of this action, the voltage impressed across the load circuit will be reduced to the desired value. Conversely, the system operates in the reverse manner to raise the voltage across the load circuit to the predetermined value in the event the voltage of the load circuit tends to decrease below the predetermined value. The positive unidirectional voltage produced by capacitance 41 is of a pulsating nature having a period greater than one-half cycle of the supply voltage due to the time constant of the associated circuit. The peak value of this voltage remains constant due to the regulating action of transformer 43 so that the resultant regulating effect of electric valve means 19 is determined by the difference of the positive and negative unidirectional control voltages.

In the event the load circuit demands a current greater than the predetermined value for which relays 58 and 59 are set, at least one of these relays will operate to open circuit 55 effecting deenergization of coils 67 and 51 of relay 66 and circuit controlling means 50, respectively, to disconnect the load circuit and the saturable inductive device 14 from the supply circuit thereby protecting the system. Of course, the operation of the system may be stopped by operating switches 57 and 85.

It will be apparent that apparatus incorporating the time delay feature, particularly the time delay relay 63, affords a greater precision in operation than that offered by the prior art arrangements. For example, in those applications where it is desirable to accurately control the voltage applied to a load circuit at all times including the period immediately following the energization of the load circuit, it is to be observed that if the control winding 16 were energized before the closure of contacts 52 and 53, or closed before the starting voltage or current transients had sufficient time to subside, the system would be prevented from carrying out its regulatory action with the required precision. Since time delay relay 63 by virtue of its contacts 65 prevents closure of the circuit for energizing control winding 16 before closure of contacts 52 and 53 and since contacts 65 close with a time delay, the operation of the system during the initiating period is stabilized so that immediately upon closure of contacts 65 the regulatory action is accomplished with a high degree of precision.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating current supply circuit, a load circuit, means for controlling an electrical condition of said load circuit, means for controlling said first mentioned means and including an electric valve comprising a control member, an excitation circuit including control means for impressing on said control member a voltage tending to increase the magnitude of said electrical condition, circuit controlling means for connecting said load circuit to said supply circuit, initiating means and time delay means responsive to said initiating means for delaying energization of the means including said electric valve for a predetermined interval of time after the closure of said circuit controlling means to prevent increase in said condition under the action of said first mentioned means during said interval.

2. In combination, an alternating current supply circuit, a load circuit, means for controlling an electrical condition of said load circuit comprising a saturable inductive reactance having a control winding, means comprising an electric valve for controlling the current transmitted to said winding, said electric valve means when conducting causing the energization of said control winding and effecting a decrease in the impedance of said saturable reactance thereby tending to increase the magnitude of said electrical condition, circuit controlling means for connecting said load circuit to said supply circuit, initiating means and time delay means responsive to said initiating means for delaying the energization of said control winding for a predetermined interval of time after the closure of said circuit controlling means.

3. In combination, an alternating current supply circuit, a load circuit, means for controlling an electrical condition of said load circuit comprising a saturable inductive reactance having a control winding, means comprising an electric valve for controlling the current transmitted to said winding, said electric valve means when conducting causing the energization of said control winding and effecting a decrease in the impedance of said saturable reactance thereby tending to increase the magnitude of said electrical condition, circuit controlling means for connecting said load circuit to said supply circuit, means for initiating energization of said load circuit by controlling said circuit controlling means, and means responsive to the initiating means for preventing energization of said control winding until after operation of said circuit controlling means.

4. In combination, an alternating current supply circuit, a load circuit, means for controlling an electrical condition of said load circuit comprising a saturable inductive device having a control winding, means for transmitting variable amounts of current to said control winding and including an electric valve means, said electric valve means when conducting causing the energization of said control winding and effecting a decrease in the impedance of said saturable reactance thereby tending to increase the magnitude of said electrical condition, circuit controlling means including contacts for connecting said load circuit to said supply circuit, means for initiating energization of said load circuit comprising means for operating said circuit controlling means, and time delay means responsive to said initiating means and having contacts for controlling the energization of said control winding and for delaying energization thereof for a predetermined interval of time after the closure of the contacts of said circuit controlling means.

5. In combination, an alternating current supply circuit, a load circuit, means for controlling an electrical condition of said load circuit including a saturable inductive device having a main winding in series relation with said load circuit and having a control winding, means for transmitting variable amounts of current to said control winding, said electric valve means when conducting causing the energization of said control winding and effecting a decrease in the impedance of said saturable reactance thereby tending to increase the magnitude of said electrical condition, circuit controlling means connected in series relation with said load circuit and said main winding, initiating means for operating said circuit controlling means, and means responsive to said initiating means for delaying energization of the control winding for a predetermined interval of time after the closure of said circuit controlling means.

6. In combination, an alternating current supply circuit, a load circuit, means for controlling the voltage of said load circuit comprising a saturable inductive device having a main winding connected in series relation with said load circuit and having a control winding, control means for variably energizing said control winding in response to the voltage of said load circuit, said electric valve means when conducting causing the energization of said control winding and effecting a decrease in the impedance of said saturable reactance thereby tending to increase the magnitude of said voltage, circuit controlling means for connecting said load circuit to said supply circuit, initiating means for operating said circuit controlling means, and time delay means responsive to said initiating means for delaying the energization of the control winding for a predetermined interval of time after the closure of the circuit controlling means.

AUGUST R. RYAN.